US005301874A

United States Patent [19]

Vogt et al.

[11] Patent Number: 5,301,874

[45] Date of Patent: Apr. 12, 1994

[54] ADJUSTING SLEEVE FOR AN ELECTROMAGNETICALLY ACTUATABLE VALVE

[75] Inventors: Dieter Vogt, Korntal-Muenchingen; Ferdinand Reiter, Markgroeningen; Martin Maier, Moeglingen, all of Fed. Rep. of Germany

[73] Assignee: Robert Bosch GmbH, Stuttgart, Fed. Rep. of Germany

[21] Appl. No.: 698,029

[22] Filed: May 10, 1991

[30] Foreign Application Priority Data

May 26, 1990 [DE] Fed. Rep. of Germany ....... 4016996
Mar. 16, 1991 [DE] Fed. Rep. of Germany ....... 4108665

[51] Int. Cl.[5] ...................... F16K 31/02; F02M 51/06; F15B 13/044; H01F 7/16

[52] U.S. Cl. .............................. 239/585.4; 239/585.1; 251/129.18

[58] Field of Search ............................ 239/585, 533.9; 251/129.18, 129.21; 267/179; 403/285, 345, 371

[56] References Cited

U.S. PATENT DOCUMENTS

| | | | |
|---|---|---|---|
| 2,519,035 | 8/1950 | Esty | 403/345 |
| 3,447,820 | 6/1969 | Durnan | 403/282 |
| 4,575,009 | 3/1986 | Giraudi | 239/585 |
| 4,660,770 | 4/1987 | Giesking | 239/533.9 |
| 4,706,887 | 11/1987 | Harvey et al. | 239/533.9 |
| 4,807,812 | 2/1989 | Renowden et al. | 239/585 |
| 4,946,107 | 8/1990 | Hunt | 251/129.21 |
| 4,967,966 | 11/1990 | Babitzka et al. | 239/585 |

FOREIGN PATENT DOCUMENTS

| | | | |
|---|---|---|---|
| 2528683 | 1/1976 | Fed. Rep. of Germany | 239/585 |

*Primary Examiner*—Karen B. Merritt
*Attorney, Agent, or Firm*—Edwin E. Greigg; Ronald E. Greigg

[57] ABSTRACT

In electromagnetically actuatable valves, an adjusting sleeve is pressed into the flow bore of a core in order to adjust the spring force of a restoring spring. Because the known adjusting sleeves, for instance having two beads, have a sharp-edged embodiment in the region toward the flow bore, chips can be produced when they are pressed into the flow bore. The novel adjusting has a transitional region on its circumference, between the at least one bead and an end segment oriented toward the valve closing body; at least one rounded portion is provided between the transitional region and the adjacent bead. Thus when the adjusting sleeve is pressed into the flow bore of the core, chip formation at the adjusting sleeve and flow bore is prevented. The adjusting sleeve is particularly suitable for injection valves of fuel injection systems of mixture-compressing internal combustion engines with externally supplied ignition.

22 Claims, 3 Drawing Sheets

ADJUSTING SLEEVE FOR AN ELECTROMAGNETICALLY ACTUATABLE VALVE

BACKGROUND OF THE INVENTION

The invention is based on an adjusting sleeve for an electromagnetically actuatable valve as described hereinafter. German Offenlegungsschrift 33 0 304 discloses an adjusting sleeve for an electromagnetically actuatable valve that is fitted into a flow bore, formed concentrically with the longitudinal valve axis in the core, and has two circumferential beads that have a larger diameter than the diameter of the flow bore. The adjusting sleeve serves to adjust the spring force of a restoring spring which acts upon the valve closing body. On its end toward the valve closing body, the adjusting sleeve has a closure face extending perpendicular to the longitudinal axis of the valve, so that the bead oriented toward the valve closing body ends in a sharp edge without any transition at the closure face. However, the transition between the middle region, having a smaller diameter than the flow bore, toward the two beads is also embodied as a sharp edge in the immediate vicinity of the flow bore of the core In the known adjusting sleeve, there is accordingly the danger that chips will form as it is fitted into the flow bore of the core, and these chips can cause destruction of the valve during operation.

OBJECT AND SUMMARY OF THE INVENTION

The adjusting sleeve according to the invention has the advantage over the prior art that at least one rounded portion is provided between the transitional region and the at least one bead, so that when the adjusting sleeve is fitted into the flow bore of the core, chip formation at the adjusting sleeve and at the flow bore is prevented, effectively and simply. Because of the reduced diameter of the end portion, particularly simple installation of the adjusting sleeve in the flow bore of the core is possible, since the adjusting sleeve is self-centering in the flow bore and cannot tilt as it is being pressed inwardly.

A particularly advantageous feature is for two encompassing beads to be provided on the circumference of the adjusting sleeve, so that unintentional shifting of the adjusting sleeve pressed into the flow bore of the core during operation is prevented especially reliably and safely.

Another advantage is, if at least one bead is embodied as convex and the adjusting sleeve is pressed into the flow bore of the core chip formation is avoided particularly effectively.

For simple installation it is also advantageous if the adjusting sleeve has a longitudinal slit in the axial direction. An adjusting sleeve embodied in this way cannot only be fitted into the flow bore of the core with relatively little expenditure of force, but shifting of the adjusting sleeve out of the intended position is also prevented.

For simple, economic manufacture of an adjusting sleeve according to the invention, it is advantageous in a first method step, if a tube segment is first cut from a cylindrical tube, and the tube segment is placed in a tool and upset axially, in a second step, this is accomplished in such a way that at least one bead is formed on the circumference of the tubular segment.

If the adjusting sleeve has a longitudinal slit in the axial direction, then it is particularly advantageous, for the sake of simple, economical manufacture of the adjusting sleeve according to the invention, if in a first method step, a rectangular sheet-metal segment is produced; in a second method step, in a tool, at least one bead is pressed into the sheet-metal segment transversely to a longitudinal axis thereof; and in a third method step, the sheet-metal segment is rolled about its longitudinal axis in such a way as to leave a longitudinal slit.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
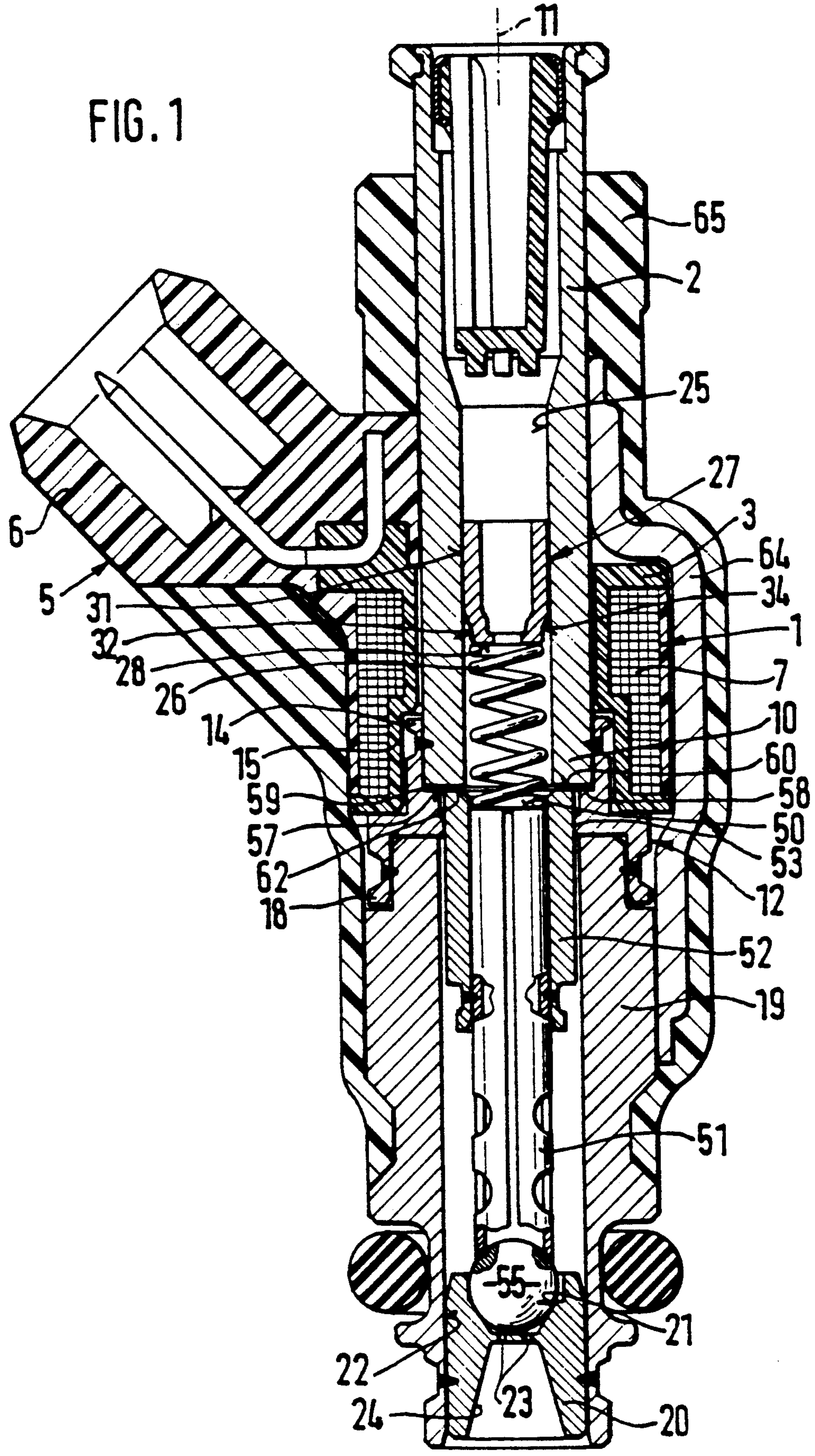
FIG. 1 shows a fuel injection valve with an adjusting sleeve according to the invention, in a first exemplary embodiment.

The electromagnetically actuatable valve shown as an example in FIG. 1, in the form of an injection valve for fuel injection systems of internal combustion engines, has a core 2 serving as a fuel inlet neck and surrounded by a magnet coil 1. The magnet coil 1, having a coil body 3, is provided with a plastic injection-molded coating 5, and an electrical connection plug 6 is molded on at the same time, thus forming a self-contained plastic injection molded part including the magnet coil 1 and the connection plug 6. The magnet coil 1, in the radial direction having the stepped coil body 3 with a winding 7 that is stepped in the radial direction, in combination with the core 2 having a constant outside diameter, makes a particularly compact injection valve structure possible.

A tubular metal intermediate part 12 is joined, for instance by welding, tightly to a lower end 10 of the core 2, concentric with a longitudinal axis 11 of the valve, and in being joined to it fits partly axially over the core end 10 with an upper cylindrical segment 14. The stepped coil body 3 partly fits over the core 2 and with a step 15 of larger diameter fits over the cylindrical segment 14 of the intermediate part 12. On its end remote from the core 2, the intermediate part 12 is provided with a lower cylindrical segment 18, which fits over a tubular connecting part 19 and is tightly connected to it, for instance by welding. A cylindrical valve seat body 20 is tightly installed by welding into the downstream end of the connecting part 19, in a through bore 22 extending concentrically with the longitudinal axis 11 of the valve. The succession of the core 2, intermediate part 12, connecting part 19 and valve seat body 20 thus forms a rigid metal unit. The valve seat body 20 has a fixed valve seat 21, oriented toward the magnet coil 1, and two injection ports 23, for example, formed by erosion, for example, are embodied downstream of the valve seat 21. Also downstream of the injection ports 23, the valve seat body 20 has a frustoconical preparation bore 24 that widens in the direction of the flow.

Figure 2:
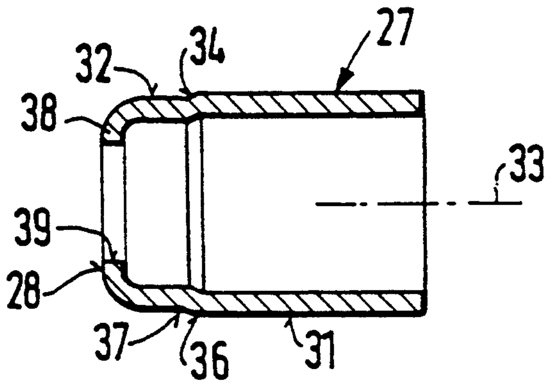
FIG. 2 shows the first exemplary embodiment of the adjusting sleeve according to the invention.

To adjust the spring force of a restoring spring 26, a tubular adjusting sleeve 27 is pressed into a flow bore 25 of the core 2; the flow bore is stepped and extends concentrically with the longitudinal axis 11 of the valve. The restoring spring 26 rests with one end on the face end 28, toward the valve seat body 20, of the adjusting sleeve 27. The depth to which the adjusting sleeve 27 is inserted into the flow bore 25 of the core 2 determines the spring force of the restoring spring 26 and thus also influences the dynamic fuel quantity injected during the opening and closing stroke of the valve FIG. 2 shows a first exemplary embodiment of an adjusting sleeve 27 according to the invention, which is also shown in FIG. 1. Elements that are the same and function the same are provided with the same reference numerals as in FIG. 1. An encompassing bead 31 is embodied on the circumference of the adjusting sleeve 27, in the region remote from the restoring spring 26; the bead 31 has a larger diameter than the flow bore 25 of the core 2. Toward the restoring spring 26, the circumference of the adjusting sleeve 27 has an end segment 32, which has a smaller diameter than the flow bore 25. A transition region 34 extending obliquely to a longitudinal axis 33 of the sleeve is formed in the axial direction between the bead 31 and the end segment 32. A convex rounded portion 36 is embodied between the transitional region 34 and the bead 31, on the circumference of the adjusting sleeve 27, and a concave rounded portion 37 is formed there between the end segment 32 and the transition region 34. When the adjusting sleeve 27 is pressed into the flow bore 25, the formation of chips at the adjusting sleeve 27 and flow bore 25 of the core 2 is thus effectively and simply prevented. Because of the small diameter of the end segment 32 of the adjusting sleeve 27 compared with the flow bore 25 the adjusting sleeve 27 centers itself when it is pressed into the flow bore 25.

On the end of the segment 32 oriented toward the restoring spring 26, a retaining rim 38 that points radially inward is formed; with its face end 28, it serves as a bearing face for the restoring spring 26. The retaining rim 38 has a through opening 39 concentric with the longitudinal axis 33 of the sleeve, assuring a problem-free flow of fuel through the tubular adjusting sleeve 27.

The adjusting sleeve 27 of the first exemplary embodiment of the invention can be produced simply and economically, for example by deep drawing.

Figure 3:
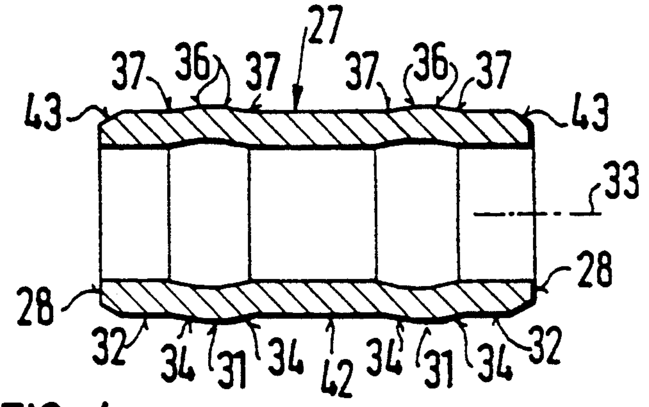
FIG. 3 shows a second exemplary embodiment of an adjusting sleeve according to the invention.

A second exemplary embodiment of a tubular adjusting sleeve 27 according to the invention is shown in FIG. 3; elements that are the same and function the same are again provided with the same reference numerals as in FIGS. 1 and 2. Two encompassing beads 31 are provided on the circumference of the adjusting sleeve 27; they are embodied pointing outward convexly in the radial direction. Between the two beads 31, a cylindrical middle region 42 has a smaller diameter than the flow bore 25, while the two encompassing beads 31 contrarily have a larger diameter than the flow bore 25. On both ends, the adjusting sleeve 21 has a respective cylindrical end segment 32 on its circumference, and this segment has a smaller diameter than the flow bore 25. Toward the two face ends 28 of the adjusting sleeve 27, the two end segments 32 each have a chamfer 43, which makes it simpler to introduce the adjusting sleeve 27 into the flow bore 25 of the core 2.

Between the cylindrical end segments 32 and the convex beads 31 and between the cylindrical middle region 42 and the convex beads 31, transitional regions 34 are formed, which have convex rounded portions 36 oriented toward the beads 31 and concave rounded portions 37 oriented toward the cylindrical end segments 32 and the cylindrical middle region 42, so that when the adjusting sleeve 27 is pressed into the flow bore 25, the formation of chips at the adjusting sleeve 27 and at the flow bore 25 of the core 2 is prevented effectively and simply. Because of the limited contact surface area between the adjusting sleeve 27 and the flow bore 25, which area is embodied by the two encompassing beads 31, undesired shifting of the adjusting sleeve 27 in the flow bore 25 of the core 2 during valve operation is effectively prevented.

Because of the symmetrical embodiment of the adjusting sleeve 27 toward both face ends 28, installation of the adjusting sleeve in the flow bore 25 becomes simpler, because it does not matter which face end 28 of the adjusting sleeve 27 is introduced into the flow bore 25 first. The fact that the diameter of the end segments 32 is less than that of the flow bore 25 leads to self-centering of the adjusting sleeve 27 in the flow bore 25 in the installation process.

In the second exemplary embodiment, the adjusting sleeve 27 is produced for instance in such a way that in a first method step, a tube segment is cut from a cylindrical tube, and in a second method step, the tube segment is placed in a tool and upset in the axial direction in such a way that the two encompassing convex beads 31 are formed on the circumference of the tube segment.

A suitable material for the manufacture of the adjusting sleeve 27 according to the invention is brass or a stainless hardened steel, and also a stainless spring steel.

Figure 4:
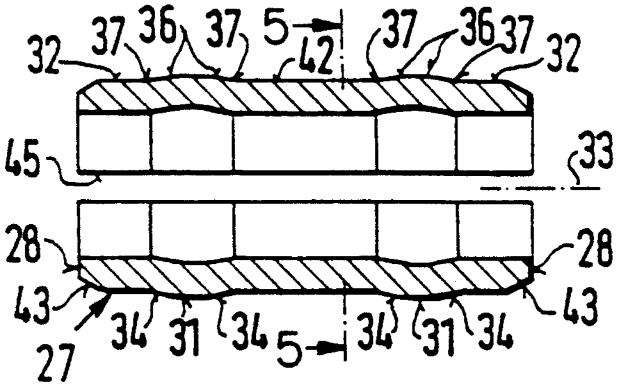
FIG. 4 shows a third exemplary embodiment of an adjusting sleeve according to the invention.
Figure 5:
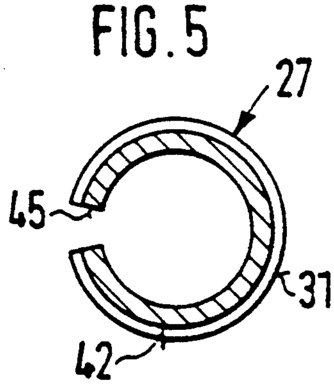
FIG. 5 is a section taken along the line 5—5 of FIG. 4.

A variant of the second exemplary embodiment shown in FIG. 3 is provided by the third exemplary embodiment shown in FIGS. 4 and 5, in which the same elements with the same function are identified by the same reference numerals as in FIG. 3. FIG. 5 shows a section taken along the line 5—5 of FIG. 4. In the third exemplary embodiment, the adjusting sleeve 27 has two encompassing beads 31 on its circumference, which point outward convexly in the radial direction; a cylindrical middle region 42 between the two beads 31; and a cylindrical end segment 32 on each of the two ends. The diameter of the two beads 31 is larger than the diameter of the flow bore 25; contrarily, the diameters of the cylindrical end portions 32 and of the cylindrical middle regions 42 are smaller than the diameter of the flow bore 25. The two end segments 32 each have an encompassing chamfer 43 on their respective ends oriented toward the face ends 28, which makes it simpler to introduce the adjusting sleeve 27 into the flow bore 25.

The transitional regions 34, formed both between the cylindrical end portions 3 and the convex beads 31 and between the cylindrical middle regions 42 and the convex beads 31, in particular the convex rounded portions 36 oriented toward the beads 31 and the concave rounded portions 37 oriented toward the cylindrical end segments 32 and cylindrical middle region 42, effectively prevent chips from being formed at the adjusting sleeve 27 and flow bore 25 of the core 2 when the adjusting sleeve 27 is fitted into the flow bore 25.

The adjusting sleeve 27 has a longitudinal slit 45 in the axial direction, so that the adjusting sleeve 27 can be fitted into the flow bore 25 of the core 2 with relatively little exertion of force, thus making installation easier. Since the slit adjusting sleeve 27 has a markedly larger diameter than the flow bore 25, the adjusting sleeve 27 is under high radially oriented tension in the state in which it is installed in the flow bore 25. This assures particularly safe, reliable retention of the adjusting sleeve 27 in the flow bore 25.

A particularly simple and economical manufacture of an adjusting sleeve 27 of the third exemplary embodiment is for example attained in that in a first method step, a rectangular sheet-metal segment is made, for instance from a spring steel; in a second method step, in a tool, the two beads 31 are pressed into the sheet-metal segment, transversely to the later longitudinal axis 33 of the sleeve made from the sheet-metal segment; and in a third method step, the sheet-metal segment is rolled around the longitudinal axis 33 of the sleeve to make an adjusting sleeve 27 having a longitudinal slit 45 left open.

Figure 6:
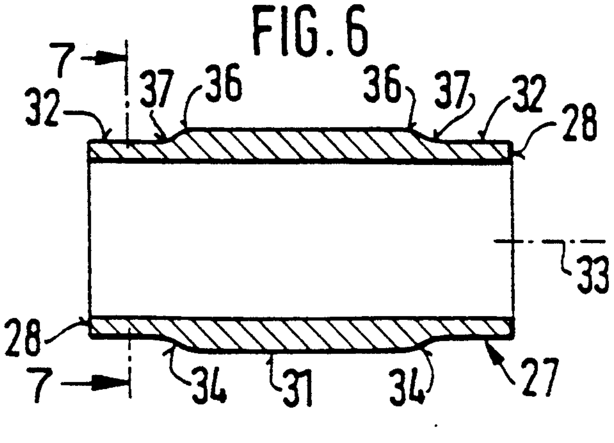
FIG. 6 shows a fourth exemplary embodiment.
Figure 7:
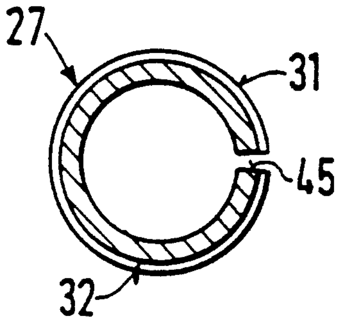
FIG. 7 is a section taken along the line 7—7 of FIG. 6.

FIGS. 6 and 7, the latter being a section taken along the line 7—7 of FIG. 6, show a fourth exemplary embodiment according to the invention of the tubular adjusting sleeve 27; once again, elements that are the same and function the same are provided with the same reference numerals as in FIGS. 4 and 5.

A cylindrical bead 31 is formed on the circumference of the adjusting sleeve 27 in its middle region; the bead has a larger diameter than the flow bore 25. Toward the two face ends 28, the adjusting sleeve 27 has one end segment 32 on its circumference on each end, and the end segment has a smaller diameter than the flow bore 25. A transitional region 34 extending obliquely to the longitudinal axis 33 of the sleeve is embodied between the cylindrical bead 31 and the two cylindrical end segments 32. To effectively prevent the formation of chips at the adjusting sleeve 27 and flow 25 of the core 2 when the adjusting sleeve 27 is pressed into the flow bore 25, a convex rounded portion 36 and a concave rounded portion 37 are formed, the former between the two transitional regions 34 and the cylindrical bead 31 and the latter between the two transitional regions 34 and the applicable end segments 32. The end segments 32 enable easy introduction of the adjusting sleeve 27 into the flow bore 25 of the core 2. The danger of tilting is avoided, since the adjusting sleeve 27 is self-centering in the flow bore 25.

To facilitate installation, the adjusting sleeve 27 has a longitudinal slit 45 in the axial direction, thus assuring particularly safe and reliable retention of the adjusting sleeve 27 and the flow bore 25 of the core 2, since the installed adjusting sleeve 27 is under particularly high radially oriented tension.

When the adjusting sleeve 27 is installed in the flow bore 25 of the core 2, it does not matter by which face end 28 the adjusting sleeve 27 is introduced into the flow bore 25 first, since the adjusting sleeve 27 is embodied symmetrically in the direction of both of its face ends 28.

The production of the slit adjusting sleeve 27 is effected for instance in that in a first method step, a rectangular sheet-metal segment is made, for instance from a spring steel; in a second method step, in a tool, the two end segments 32, having a reduced cross-sectional area, are formed by sheet-metal deformation in the sheet-metal segment transversely to the later longitudinal axis 33 of the sleeve; and in a third method step, the sheet-metal segment is rolled around the longitudinal axis 33 of the sleeve to make an adjusting sleeve 27 with a remaining longitudinal slit 45.

In the downstream direction, the restoring spring 26 is supported by its end remote from the adjusting sleeve 27 on a face end 50 of a connecting tube 51. A tubular armature 52, which is guided by a guide color 53 of the intermediate part 12, is joined to the end toward the restoring spring 26 of the connecting tube 51, for example by welding. On the other end of the connecting tube 51, a valve closing body 55, for instance in the form of a ball, cooperating with the valve seat 21 of the valve seat body 20 is connected to the connecting tube 51, for example by welding.

Referring again to FIG. 1, an axial gap 59 is formed between one face end 57 of the core end 10 toward the armature 52 and a shoulder 58 of the intermediate part 12 leading to the upper cylindrical segment 14; in this gap, by wedging, a nonmagnetic stop washer 62 that limits the stroke of the valve closing body 55 in the opening process of the valve is provided; it forms a remnant air gap between a face end 60 of the armature 52 toward the inflow and the face end 57 of the core end 10. The wedged stop washer 62 protects the face end 57 of the core end 10 better, because of its greater flexural strength, against wear than a loose stop washer 62 would, in which there would be the danger of tilting and of uneven contact.

The magnet coil 1 is surrounded by at least one guide element 64, for example embodied as a hoop and serving as a ferromagnetic element; it extends axially over the entire length of the magnet coil 1, and at least partially surrounds the magnet coil 1 in the circumferential direction, and at one end rests on the core 2 and at the other it rests on the connecting part 19 and is joined thereto, for example by welding or soldering.

Part of the valve is surrounded by a plastic sheath 65, which extends from the core 2 axially over the magnet coil 1 and connection plug 6 and over the at least one guide element 64.

Figure 8:
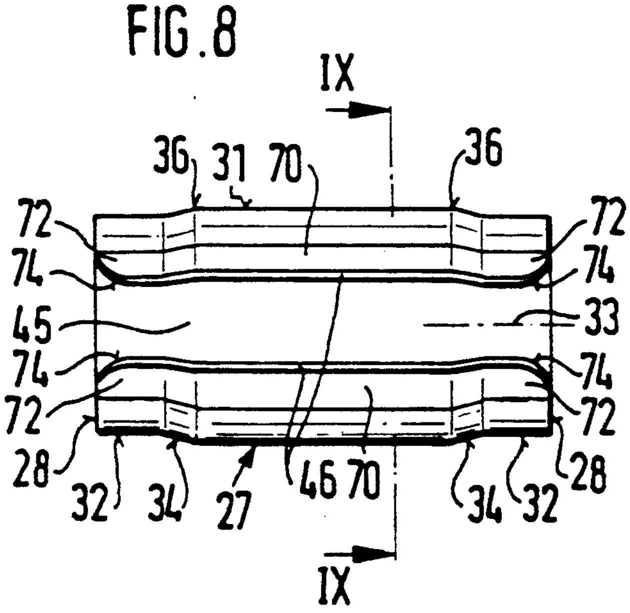
FIG. 8 shows a fifth exemplary embodiment.
Figure 9:
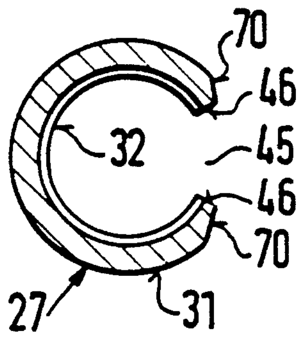
FIG. 9 shows a section taken along the line 9—9 of FIG. 8.

A fifth exemplary embodiment of an adjusting sleeve according to the invention is shown in FIGS. 8 and 9, in which elements that are the same and function the same are identified by the same reference numerals as in FIGS. 1-7. FIG. 9 shows a section along the line 9—9 of FIG. 8.

A cylindrical bead 31 is formed on the circumference of the adjusting sleeve 27, and has a larger diameter than that of the flow bore 25. Toward both face ends 28, the adjusting sleeve 27 has one end portion 32 each on its circumference; these end portions have a smaller diameter than that of the flow bore 25 and hence of the bead 31. One transitional region 34 each, extending at an incline to the longitudinal axis 33 of the sleeve, is located between the cylindrical bead 31 and each of the two cylindrical end portions 32. In order to effectively prevent chips from being produced at the adjustment sleeve 27 and flow bore 25 of the core 2 when the adjusting sleeve 27 is wedged into the flow bore 25, a convex rounded area 36 is formed between each of the two transitional regions 34 and the cylindrical bead 31. The end portions 32 enable easy introduction of the adjusting sleeve 27 into the flow bore 25 of the core 2. To facilitate assembly, the adjusting sleeve 27 has a longitudinal slit 45 in the axial direction, as a result of which the adjusting sleeve 27 can be radially elastically deformed for assembly purposes, thus assuring a particularly secure and reliable hold of the adjusting sleeve 27 in the flow bore 25 of the core 2, since the mounted adjusting sleeve 27 is subject to particularly high radially oriented strain. The longitudinal slit 45 is defined by two opposed, approximately radially oriented edges 46.

In the circumferential region, beginning at one edge 46 each of the longitudinal slit 45, the cylindrical bead 31 of the adjusting sleeve 27 has one transitional region 70 each, the diameter of which lessens continuously toward the edge 46 of the longitudinal slit 45. This may for instance be attained by grinding part of the bead 31 away in the transitional regions 70, or by deforming the transitional regions 70 of the adjusting sleeve 27 inward in the radial direction. This further lessens the danger that chips will be produced when the adjusting sleeve 27 is assembled. For the same reason, each of the end portions 32 of the adjusting sleeve 27 has an outwardly curved convex rounded area 74 at each face end 28 and in the corner regions bordering on the longitudinal slit 45. The thickness of the sheet metal of the adjusting sleeve 27 is approximately constant over its entire length, for example.

Materials suitable for manufacture of the adjusting sleeve 27 according to the invention include not only stainless, hardened steel and stainless spring steel, but also copper alloys rolled to spring hardness such as bronze, brass, Tombak (a copper-tin-zinc alloy), or copper beryllium. Using these copper alloys prevents seizing or scuffing between the material of the core 2 and the material of the adjusting sleeve 27.

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the United States is:

1. An adjusting sleeve for an electromagnetically actuatable valve, in particular an injection valve for fuel injection systems of internal combustion engines, having a tubular metal core extending along a longitudinal axis of the valve, the core being surrounded by a magnet coil; an armature, by which a valve closing body cooperating with a fixed valve seat can be actuated; a restoring spring disposed concentrically with the longitudinal axis of the valve and acting on the valve closing body and being supported by one end on a cylindrical adjusting sleeve pressed into a flow bore of the core, the flow bore embodied concentrically with the longitudinal axis of the valve; wherein at least one encompassing bead is formed on the circumference of the adjusting sleeve, the at least one encompassing bead having a larger diameter than the diameter of a portion of the flow bore; said adjusting sleeve (27) having at least one transitional region (34) between the at least one encompassing bead (31) and an end portion (32), oriented toward the valve closing body (55) and being of lesser diameter than the flow bore (25), and at least one rounded area (36) being provided between the at least one transitional region (34) and the at least one encompassing bead (31).

2. An adjusting sleeve as defined by claim 1, in which at least one bead (31) of the adjusting sleeve (27) is embodied convexly.

3. An adjusting sleeve as defined by claim 2, in which the adjusting sleeve (27) has a longitudinal slit (45).

4. An adjusting sleeve as defined by claim 1, in which the adjusting sleeve (27) has a longitudinal slit (45).

5. An adjusting sleeve as defined by claim 4, in which said bead (31) is cylindrical and has respective transitional regions (70) oriented toward the longitudinal slit (45) in the circumferential direction, the diameter of said transitional regions lessens continuously toward edges (46) of the longitudinal slit (45).

6. An adjusting sleeve as defined by claim 1, in which the adjusting sleeve (27) is brass.

7. An adjusting sleeve as defined by claim 1, in which the adjusting sleeve (27) is hardened stainless steel.

8. An adjusting sleeve as defined by claim 1, in which the adjusting sleeve (27) is a stainless steel spring element.

9. An adjusting sleeve as defined by claim 1, in which the adjusting sleeve (27) is embodied of a copper alloy rolled to spring hardness.

10. An adjusting sleeve for an electromagnetically actuatable valve, in particular an injection valve for fuel injection systems of internal combustion engines, having a tubular metal core extending along a longitudinal axis of the valve, the core being surrounded by a magnet coil; an armature, by which a valve closing body cooperating with a fixed valve seat can be actuated; a restoring spring disposed concentrically with the longitudinal axis of the valve and acting on the valve closing body and being supported by one end on a cylindrical adjusting sleeve pressed into a flow bore of the core, the flow bore embodied concentrically with the longitudinal axis of the valve; wherein two encompassing beads are formed on the circumference of the adjusting sleeve, the two beads having a larger diameter than the diameter of a portion of the flow bore; said adjusting sleeve (27) having at least one transitional region (34) between at least one bead (31) and and end portion (32), oriented toward the valve closing body (55) and being of lesser diameter than the flow bore (25), and at least one rounded area (36) being provided between the at least one transitional region (34) and the bead (31).

11. An adjusting sleeve as defined by claim 10, in which at least one of the two beads (31) of the adjusting sleeve (27) is embodied convexly.

12. An adjusting sleeve as defined by claim 11, in which said adjusting sleeve includes opposite end portions (32) and opposite face ends (28), said opposite end portions have a convex rounded area (74) in corner regions (72) bordering on the face ends (28) and on the longitudinal slit (45).

13. An adjusting sleeve as defined by claim 10, in which the adjusting sleeve (27) has a longitudinal slit (45).

14. A method for producing an adjusting sleeve for use in a flow bore of an injection valve for a fuel injection system of an internal combustion engine, the steps comprising:

severing a predetermined length of stock from a cylindrical tubular body to form a tube segment;

placing said tube segment into a pressing tool having at least one indentation thereon;

applying a force on said tube segment in a diametrical direction;

whereby said at least one indentation in the pressing tool forms at least one radially outward bulge in the circumference of said tube segment to form at least one bead (31).

15. A method as set forth in claim 14, in which said pressing tool is rapidly rotated.

16. A method as set forth in claim 15, wherein heat is applied to said tube segment during forming said at least one bead.

17. A method as set forth in claim 14, wherein heat is applied to said tube segment during forming said at least one bead.

18. A method of producing an adjusting sleeve as claimed in claim 14, the further step of cutting a longitudinal slit along the length of stock to thereby provide a limited flexure of said adjusting sleeve.

19. A cylindrical adjusting sleeve pressed into a bore wherein at least one encompassing bead is formed on the circumference of the adjusting sleeve, the at least one encompassing bead having a larger diameter than the diameter of a portion of the bore; said adjusting sleeve (27) having at least one transitional region (34) between the at least one encompassing bead (31) and an end portion (32) being of lesser diameter than the bore (25), at least one rounded area (36) being provided between the at least one transitional region (34) and the at least one encompassing bead (31), and the adjusting sleeve (27) has a longitudinal slit (45).

20. A cylindrical adjusting sleeve pressed into a bore wherein two encompassing beads are formed on the circumference of the adjusting sleeve, the two beads having a larger diameter than the diameter of a portion of the bore; said adjusting sleeve (27) having at least one transitional region (34) between the two beads (31) and an end portion (32) being of lesser diameter than the bore (25), at least one rounded area (36) being provided between the at least one transitional region (34) and the two beads (31), and the adjusting sleeve (27) has a longitudinal slit (45).

21. An adjusting sleeve as defined by claim 20, in which at least one of the two beads (31) of the adjusting sleeve (27) is embodied convexly.

22. A cylindrical adjusting sleeve pressed into a bore wherein at least one encompassing bead is formed on the circumference of the adjusting sleeve, the at least one encompassing bead having a larger diameter than the diameter of a portion of the bore; said adjusting sleeve (27) having at least one transitional region (34) between the at least one encompassing bead (31) and an end portion (32) being of lesser diameter than the bore (25), at least one rounded area (36) being provided between the at least one transitional region (34) and the at least one encompassing bead (31), said at least one encompassing bead (31) of the adjusting sleeve (27) is embodied convexly, and the adjusting sleeve (27) has a longitudinal slit (45).

* * * * *